Jan. 18, 1949.　　　　P. R. POWELL　　　　2,459,336
COLLAPSIBLE REEL
Filed Oct. 22, 1946　　　　2 Sheets-Sheet 1
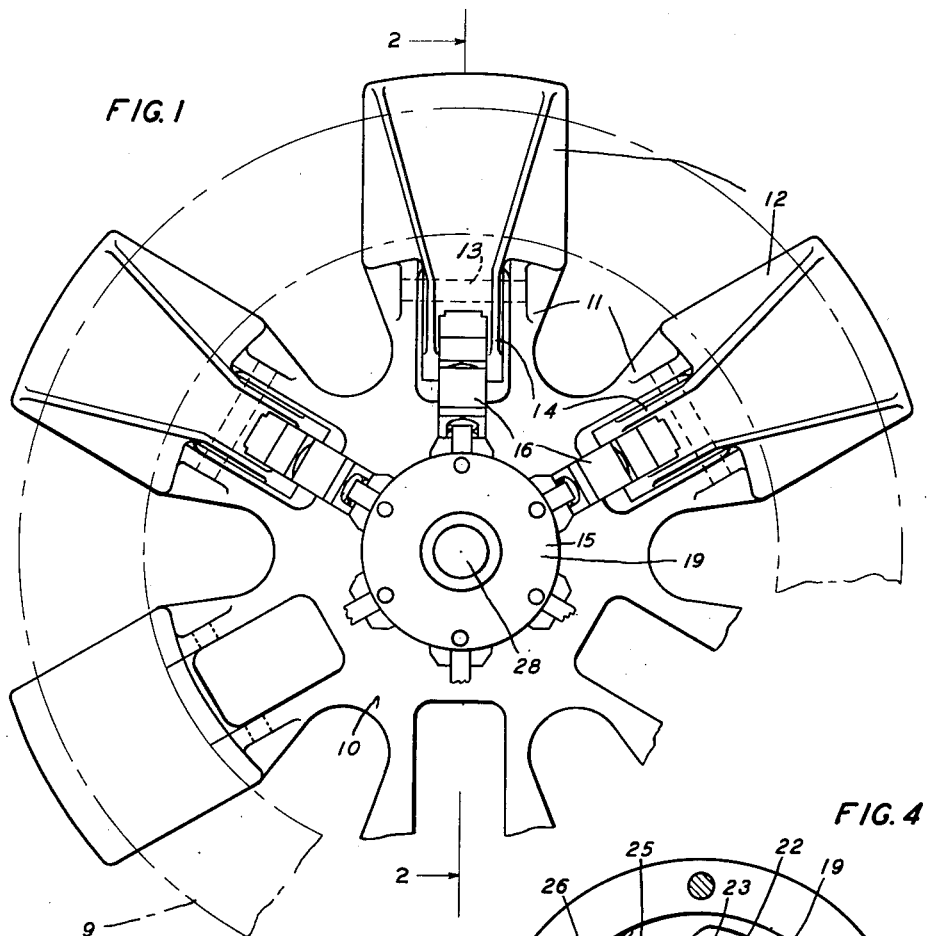
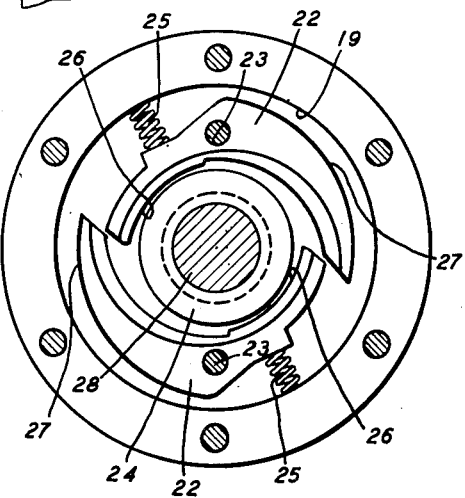
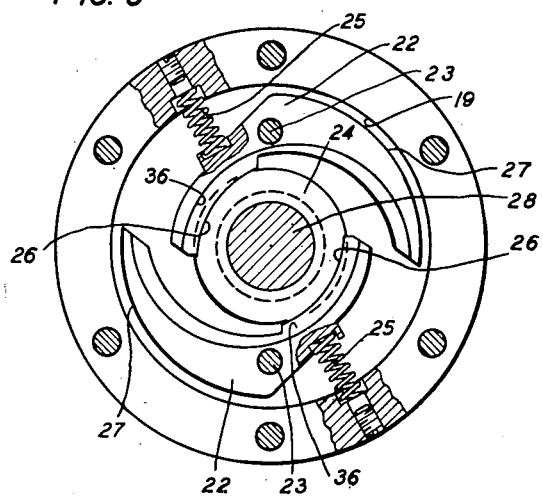
INVENTOR
P. R. POWELL
BY
ATTORNEY Jan. 18, 1949.                P. R. POWELL                2,459,336
                              COLLAPSIBLE REEL
Filed Oct. 22, 1946                                    2 Sheets-Sheet 2

INVENTOR
P. R. POWELL
BY
ATTORNEY

Patented Jan. 18, 1949

2,459,336

UNITED STATES PATENT OFFICE 2,459,336

COLLAPSIBLE REEL

Paul R. Powell, Baltimore, Md., assignor to Western Electric Company, Incorporated, New York, N. Y., a corporation of New York Application October 22, 1946, Serial No. 704,819

6 Claims. (Cl. 242—111)

This invention relates to collapsible reels, and has for an object thereof the provision of new and improved collapsible reels.

A further object of the invention is to provide new and improved collapsible reels which may be easily collapsed and which may be securely latched in uncollapsed conditions.

A collapsible reel illustrative of the invention includes a solid section and a plurality of collapsible reel segments. The reel section and the reel segments are secured to a shaft for rotation therewith, and the collapsible reel segments are secured to a hub slidable on the shaft. A plurality of latches are mounted pivotally in a slot formed in the hub and are urged toward positions projecting over the end of the shaft to latch the hub in a position in which it holds the reel segments in uncollapsed positions. A wedge-shaped member mounted slidably on the shaft serves to engage complimentary wedge-shaped portions on the latches to force the latches to unlatching positions so that the reel may be collapsed.

A complete understanding of the invention may be obtained from the following detailed description of a collapsible reel forming a specific embodiment thereof, when read in conjunction with the appended drawings, in which:

Fig. 1 is a fragmentary, front elevation of a collapsible reel forming one embodiment of the invention;

Fig. 3 is an enlarged, vertical section taken along line 3—3 of Fig. 2, and

Fig. 4 is an enlarged, vertical section similar to Fig. 3, but with portions of the collapsible reel in different positions than those shown in Fig. 3.

Figure 2:
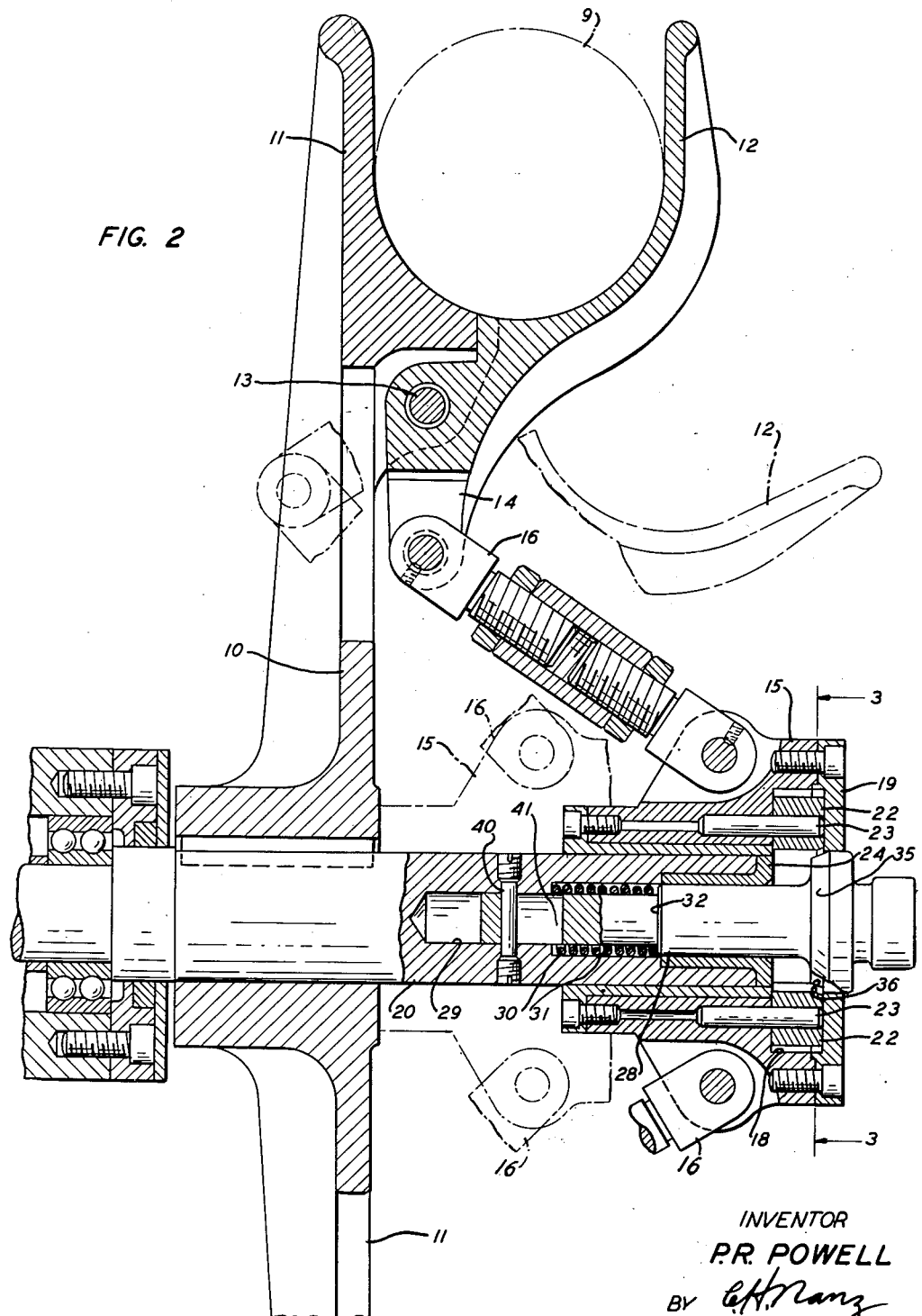
Fig. 2 is an enlarged, vertical section taken along line 2—2 of Fig. 1.

Referring now in detail to the drawings, there is shown therein a collapsible reel for coiling insulated or jacketed conductors, or other filamentary articles, thereon to form a coil 9 (Fig. 1), which may be tied for further handling of the coil. The collapsible reel includes a solid reel section 10 (Fig. 2) having arms 11—11 projecting therefrom. Collapsible reel segments 12—12 are secured to the arms 11—11 by pins, of which a pin 13 is shown. Yokes 14—14 of the segments 12—12 are secured to a hub 15 by adjustable links 16—16. The hub is mounted slidably on a shaft 20, which may be rotated by suitable driving means (not shown) to rotate the solid reel section 10, which is splined thereto, thereby rotating the reel segments 12—12 and the hub 15 therewith.

The reel segments 12—12 may be moved from uncollapsed positions, as illustrated in full lines in Fig. 2, to collapsed positions as illustrated in broken lines, by sliding the hub 15 to the left on the shaft 20 away from the end thereof. When the reel segments are in their uncollapsed positions, a coil of material wound on the reel segments and the arms 11—11 of the solid reel section 10 may be removed from the reel. When the hub 15 is held in the position shown in full lines in Fig. 2, the reel segments 12—12 are held in their uncollapsed positions, in which positions the collapsible reel is operable to coil a filamentary article thereon.

Rigid arcuate latches 22—22 mounted in an annular counterbore 18 formed in the hub 15 are mounted pivotally on pins 23—23 secured to the hub 15, and are held therein by a removable cap 19. The latches normally are urged by compression springs 25—25 (Fig. 3) to latching positions over the end of a hardened insert 24 secured rigidly to the end of the shaft 20 to prevent sliding of the hub 15 to the left, as viewed in Fig. 2, thereby holding the reel segments 12—12 in their uncollapsed positions. The latches 22—22 are provided with latching arms 26—26 (Fig. 3) positioned on one side of the pins 23—23 and counterweighting arms 27—27 positioned on the other side of the pins 23—23. Compression springs 25—25 urge the latches 22—22 toward their latching positions.

The product of the mass of each of the counterweighting arms 27—27 times the distance from the center of gravity thereof to the pin 23 is greater than the product of the mass of each of the latching arms 26—26 times the distance from the center of gravity thereof to the pin 23 so that, as the reel is rotated, the centrifugal force on the latches 22—22 tends to rotate the latches in counterclockwise directions, as viewed in Fig. 3, about the pins 23—23. Thus, the centrifugal action when the collapsible reel is rotated tends to hold the latching arms 21—21 in latching positions thereby augmenting the action of the compression springs 25—25.

A plunger 28 mounted slidably in a bore 29 formed in the shaft 20 is urged to the right, as viewed in Fig. 2, by a compression spring 30 mounted in a counterbore 31 formed in the shaft, which compression spring abuts a shoulder 32 formed on the plunger 28. The plunger 28 is provided with a male frusto-conical wedging portion 35, which is designed to engage female portions 36—36 formed on the latching arms 26—26 of the latches 22—22 to move the latches out of their latching positions when the plunger is moved to the left against the action of the compression spring 30. The movement of the plunger 28 to the right is limited by a pin 40 fastened to the shaft 20 and projecting through a slot 41 formed in the plunger 28. The pin limits such movement of the plunger to a position thereof in which the plunger limits the movement of the latches 22—22 in counterclockwise directions, as viewed in Fig. 3. The slot 41 permits the necessary movement of the plunger 28 relative to the shaft 20 but prevents unnecessary movement thereof. When the plunger 28 is moved to the right, the latches 22—22 are moved completely into the annular counterbore 18 so that they clear the insert 24 and the shaft completely.

In the operation of the collapsible reel described hereinabove, with the reel segments 12—12 in uncollapsed positions, the shaft 20 is rotated to rotate the reel to form the coil 9. The coil 9 then is tied by the tieing elements (not shown) being passed between the pairs of arms 11—11 and segments 12—12. The plunger 28 is pushed to the left, as viewed in Fig. 2, against the action of the compression spring 30 and the frusto-conical wedging portion 35 formed thereon engages the frusto-conical portions 36—36 formed on the latching arms 26—26 of the latches 22—22 and move the latches to positions in which the latching arms 26—26 clear the hardened insert 24. One of the reel sections 12 then is pivoted from its uncollapsed position to its collapsed position and this moves the hub 15 to the left, as viewed in Fig. 2, to its collapsed position, which moves the rest of the reel segments 12—12 through the hub 15 and the links 16—16 to their collapsed positions as the reel segment 12 is moved to its collapsed position.

As the hub 15 is moved to the left, as viewed in Fig. 2, the arcuate latches 22—22 are moved over the insert 24 of the shaft 20 and over the shaft, and are prevented by the shaft 20 from moving to their latching positions so that the plunger 28 may be released. After the coil 9 has been removed from the collapsible reel, one of the reel segments 12—12 is moved from its collapsed position to its uncollapsed position. This moves the hub 15 to the end of the shaft, and the hub 15 moves the rest of the reel segments to their uncollapsed positions. When the hub 15 reaches the end of the shaft and the segments 12—12 are in their uncollapsed positions, the compression springs 25—25 (Fig. 3) move the latching portions 26—26 of the latches 22—22 over the end of the hardened insert 24 to latch the reel segments 12—12 in their uncollapsed positions. The reel then may be used to coil another coil similar to the coil 9 thereon.

Throughout the rotation of the shaft 20, the latches 22—22 hold the hub 15 at the end of the shaft thereby holding the reel segments 12—12 in uncollapsed positions. Since a plurality of rigid latches are permitted by the construction of the collapsible reel described hereinabove and the latching actions thereof are positive, the latching actions thereof are very strong. The springs 25—25 hold the latches in latching positions, and the centrifugal forces on the counterweighting arms 27—27 when the reel is rotated not only negative the centrifugal forces on the latching arms 26—26 tending to move the latches to unlatching positions but actually augment the actions of the springs 25—25.

The above-described collapsible reel is strong and inexpensive in construction, and is simple and easy to operate. The latching portions thereof provide highly effective latching of the reel in an uncollapsed condition, and are easy to actuate to permit the reel to be collapsed.

What is claimed is:

1. A collapsible reel, which comprises a shaft, a rigid reel section carried by the shaft, a plurality of collapsible reel segments carried by the rigid reel section, said collapsible reel segments being movable between collapsed positions and uncollapsed positions, a hub mounted slidably on the shaft, a plurality of links for connecting the hub to the collapsible reel segments, a plurality of rigid latches carried by the hub for pivotal movement with respect to the hub, said shaft having portions serving to interlock with the latches when the latches are in predetermined positions and the hub is in a position holding the collapsible reel segments in uncollapsed positions, means for urging the latches toward said predetermined positions, said latches being pivotable to positions in which they clear the shaft, each of the latches being provided with a camming portion, and a plunger having camming portions for engaging the camming portions of the latches to move the latches out of interlocking engagement with the interlocking portions of the shaft.

2. In a collapsible reel including a rotatable shaft, a rigid reel section keyed to the shaft and a plurality of collapsible reel segments carried by the rigid reel section, said collapsible reel segments being movable between collapsed positions and uncollapsed positions, a latching device which comprises a hub mounted slidably on the shaft, a plurality of links for connecting the hub to the collapsible reel segments, said hub serving to hold the collapsible reel segments in uncollapsed positions when held in a position near an end of the shaft, said hub being provided with a groove facing the interior thereof, a rigid latch mounted in the groove in the hub, means for urging the latch partially out of the groove to a position in which the latch extends over the end of the shaft to hold the reel segments in their uncollapsed positions, said latch being provided with a camming face, and a plunger having a camming surface for engaging the camming face to move the latch into the groove to permit the hub to be slid on the shaft so that the reel segments may be moved to collapsed positions.

3. In a collapsible reel including a rotatable shaft, a rigid reel section carried by the shaft and a plurality of collapsible reel segments carried by the rigid reel section and being movable between collapsed positions and uncollapsed positions, a latching device which comprises a hub mounted slidably on the shaft, a plurality of links for connecting the hub to the collapsible reel segments, said hub when held in a predetermined position on the shaft serving to hold the reel segments in uncollapsed positions, a rigid latch carried by the hub in a manner such that the latch may be pivoted in a plane transverse to the longitudinal axis of the hub, said shaft being provided with an interlocking portion for interlocking with the latch to hold the hub in said position, means for urging the latch toward interlocking engagement with the interlocking portion of the shaft, and a wedge carried slidably by the shaft for moving the latch out of interlocking engagement with the interlocking portion of the shaft so that the hub may be moved from said position to permit the reel segments to be moved to their collapsed positions.

4. In a collapsible reel including a rotatable shaft, a rigid reel section carried by the shaft, a plurality of collapsible reel segments carried by the rigid reel section and being movable between collapsed positions and uncollapsed positions, a latching device which comprises a hub mounted slidably on the shaft, a plurality of links for connecting the hub to the collapsible reel segments, said hub when held in a predetermined position on the shaft serving to hold the reel segments in uncollapsed positions, a counterweighted rigid latch carried pivotally by the hub for pivotal movement in a plane transverse to the longitudinal axis of the hub, said shaft being provided with an interlocking portion for interlocking with the latch to hold the hub in said position, means for urging the latch toward interlocking engagement with the interlocking portion of the shaft, and a wedging plunger for wedging the latch out of interlocking engagement with the interlocking portion of the shaft so that the hub may be moved from said position to permit the reel segments to be moved to their collapsed positions.

5. In a collapsible reel including a rotatable shaft, a rigid reel section carried by the shaft and a plurality of collapsible reel segments carried by the rigid reel section, said collapsible reel segments being movable between collapsed positions and uncollapsed positions, a latching device which comprises a hub mounted slidably on the shaft, a plurality of links for connecting the hub to the collapsible reel segments, said hub serving to hold the reel segments in uncollapsed positions when in a predetermined position on the shaft, a plurality of rigid latches carried pivotally by the hub for pivotal movement in a plane transverse to the longitudinal axis of the hub, said shaft having portions serving to interlock with the latches when the latches are in predetermined positions and the hub is in said position holding the collapsible reel segments in uncollapsed positions, means for urging the latches toward said predetermined positions, said latches being pivotable to positions in which they clear the shaft, each of the latches being provided with a camming portion, and a plunger having a camming portion for engaging the camming portions of the latches to move the latches simultaneously out of interlocking engagement with the interlocking portions of the shaft.

6. In a collapsible reel including a rotatable shaft, a rigid reel section keyed to the shaft and a plurality of collapsible reel segments carried by the rigid reel section, said collapsible reel segments being movable between collapsed positions and uncollapsed positions, a latching device which comprises a hub mounted slidably on the shaft, said hub having a transverse depression therein, a plurality of links for connecting the hub to the collapsible reel segments, said hub and said links serving to hold the reel segments in uncollapsed positions when the hub is held in a position at an end of the shaft and to move the reel segments to collapsed positions when the hub is moved farther onto the shaft, a rigid latch carried pivotally by the hub in the depression therein for pivotal movement around an axis parallel to the longitudinal axis of the hub, said shaft having a portion serving to interlock with the latch when the latch is in a predetermined position and the hub is in said position in which it holds the collapsible reel segments in uncollapsed positions, a compression spring for urging the latch toward said predetermined position, said latch being pivotable to a position in which it clears the shaft and being provided with a camming portion, said latch being provided with a counterweighting portion to augment the action of the spring when the shaft is rotated, and a plunger carried slidably by the shaft and having a camming portion for engaging the camming portion of the latch to move the latch out of interlocking engagement with the interlocking portion of the shaft.

PAUL R. POWELL.

REFERENCES CITED

The following references are of record in the file of this patent:

UNITED STATES PATENTS

| Number | Name | Date |
| --- | --- | --- |
| 1,831,848 | Doney et al. | Nov. 17, 1931 |
| 1,904,286 | Harris | Apr. 18, 1933 |